(12) United States Patent
Schommer et al.

(10) Patent No.: US 8,096,057 B2
(45) Date of Patent: Jan. 17, 2012

(54) METHOD FOR THE RELATIVE POSITIONING OF AN OBJECT TO BE MEASURED AND OF A MOTOR VEHICLE TO A MEASURING DEVICE, AND MEASURING DEVICE AND A DEVICE FOR MEASURING A CHASSIS

(75) Inventors: Stefan Schommer, Unterschleissheim (DE); Ulrich Bichlmeier, Muehldorf (DE); Hermann Bux, Adelzhausen (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 12/304,396

(22) PCT Filed: Aug. 24, 2007

(86) PCT No.: PCT/EP2007/058798
§ 371 (c)(1),
(2), (4) Date: Apr. 9, 2009

(87) PCT Pub. No.: WO2008/028825
PCT Pub. Date: Mar. 13, 2008

(65) Prior Publication Data
US 2009/0216484 A1  Aug. 27, 2009

(30) Foreign Application Priority Data
Sep. 6, 2006  (DE) .......................... 10 2006 041 821

(51) Int. Cl.
*G01B 11/27* (2006.01)
*G01B 11/275* (2006.01)

(52) U.S. Cl. ........................... 33/203.18; 33/286; 33/288
(58) Field of Classification Search ............... 33/203.18, 33/286, 288
See application file for complete search history.

(56) References Cited

U.S. PATENT DOCUMENTS

| 2,960,776 | A | * | 11/1960 | Cannata | 33/286 |
| 4,444,496 | A | * | 4/1984 | Dale, Jr. | 356/155 |
| 4,972,494 | A | * | 11/1990 | White et al. | 382/143 |
| 4,973,155 | A | * | 11/1990 | Masuda | 356/121 |
| RE37,359 | E | * | 9/2001 | Wakamoto et al. | 250/548 |
| 6,690,456 | B2 | * | 2/2004 | Bux et al. | 356/139.09 |
| 6,807,740 | B2 | * | 10/2004 | Reed et al. | 33/286 |
| 7,454,841 | B2 | * | 11/2008 | Burns et al. | 33/288 |
| 7,860,295 | B2 | * | 12/2010 | Donner et al. | 382/141 |
| 7,877,883 | B2 | * | 2/2011 | Schommer et al. | 33/203 |
| 2006/0143931 | A1 | | 7/2006 | Jackson et al. | |
| 2008/0148581 | A1 | * | 6/2008 | Boni et al. | 33/288 |
| 2009/0301181 | A1 | * | 12/2009 | Schommer et al. | 73/117.01 |
| 2010/0060885 | A1 | * | 3/2010 | Nobis et al. | 356/139.09 |

FOREIGN PATENT DOCUMENTS
EP  0 895 056  2/1999
EP  0 971 205  1/2000
* cited by examiner Primary Examiner — Christopher Fulton
(74) Attorney, Agent, or Firm — Kenyon & Kenyon LLP

(57) ABSTRACT

A method for the relative positioning of an object to be measured with respect to a measuring device, first of all the object to be measured is detected by the measuring device and the position of the object to be measured with respect to the measuring device is ascertained. Then a return message signal is generated which indicates whether the object to be measured is located in a position that is suitable for taking the measurement or not.

19 Claims, 6 Drawing Sheets

METHOD FOR THE RELATIVE POSITIONING OF AN OBJECT TO BE MEASURED AND OF A MOTOR VEHICLE TO A MEASURING DEVICE, AND MEASURING DEVICE AND A DEVICE FOR MEASURING A CHASSIS

FIELD OF THE INVENTION

The present invention relates to a method for the relative positioning of an object to be measured with respect to a measuring device of a chassis measuring device or a motor vehicle test line.

BACKGROUND INFORMATION

In automobile service devices, particularly in automobile service devices that measure in a contactless manner, such as alignment gages, test lines, ball joint clearance testers, etc., the correct positioning of the measuring systems with respect to the object being measured is of great importance in achieving an optimal measurement.

Up to now, objects of measurement, especially the wheel rims of a motor vehicle, have been positioned with respect to the measuring devices of a measuring system by having the driver of the motor vehicle leaning out of the window, upon driving into the measuring station, constantly observing the positioning of the wheel rims with respect to the measuring devices and stopping the motor vehicle if he is able to detect that the wheel rims are located in the correct position to the measuring devices. In some measuring stations mirrors are provided which enable one to detect the positioning of the wheel rims with respect to the measuring devices.

In such automobile service devices, the positioning of the objects to be measured to the measuring system is often inconvenient, time-consuming and inexact.

SUMMARY OF THE INVENTION

It is therefore an object of the exemplary embodiments and/or exemplary methods of the present invention to provide a method and a device whereby objects to be measured may be aligned better with respect to measuring devices.

This object is attained by the subject matter as described herein. Further refinements of the exemplary embodiments and/or exemplary methods of the present invention are further described herein.

In the method according to the present invention for the relative positioning of an object to be measured to a measuring device, first of all the object to be measured itself is detected by the measuring device and subsequently its position relative to the measuring device is ascertained. In order to do this, the measuring device has a suitable data processing device, such as a repair shop computer, or is connected to one. According to that, a return message signal is generated and emitted, which indicates whether the object to be measured is located in a position that is suitable for taking the measurement or not.

According to one basic idea of the exemplary embodiments and/or exemplary methods of the present invention, the measuring sensors of the measuring device detect the object to be measured, that is to be positioned and measured, automatically, and generate a return message on its position to the operator, with the aid of which the operator is able to recognize whether the object to be measured is positioned optimally with respect to the measuring device, or whether the relative positioning of the object to be measured with respect to the measuring device still has to be corrected.

For, in optically measuring sensors, especially in measuring cameras, not only is the optimal point able to be monitored, but an appropriately weighted signal may even be generated within a surrounding area, that indicates whether the object to be measured is located in a position that is suitable for the measurement or whether this is not the case.

In a first specific embodiment of the method according to the present invention, in the case in which the object to be measured is not located in a position suitable for the measurement, the return message signal further indicates in which direction the object to be measured is to be moved. The positioning is thereby improved and speeded up, for the user is able to correct the positioning of the object to be measured with respect to the measuring device just with the aid of this signal alone.

The measuring device may be a component of a chassis measuring device or a component of a motor vehicle test line.

The object to be measured may, on the one hand, be a wheel rim or a subsection of a wheel rim of a motor vehicle, and on the other hand, it may be an element of the measuring station, particularly a rotary disk for a motor vehicle front wheel.

The advantageous refinements of the method according to the present invention that now follow, relate to those specific embodiments of the present invention in which the object to be measured is a wheel rim or a subsection of a wheel rim. Accordingly, this particular method may be designated as a method for positioning at least one wheel rim of a motor vehicle with respect to a measuring device.

At the beginning of the method, the motor vehicle is moved into the measuring station in such a way that at least one wheel rim of the motor vehicle is within the measuring range of measuring sensors or at least one measuring head of the measuring devices. In a measuring head there is usually situated a number of sensors destined for the actual measurement, and a measuring device may include a plurality of measuring heads, but may be two.

If the measuring device is one that measures in a contactless manner, at the beginning of the method, the motor vehicle is moved in such a way that a wheel rim or a subsection of a wheel rim of the motor vehicle is located within the visual range of the measuring sensors or at least of one measuring head of the measuring device. In the case of the use of a measuring device that measures in a contactless manner, one may fall back on measuring sensors measuring in a contactless manner that are present for wheel alignment, without having to provide an additional sensor system for the method according to the present invention, which makes the method according to the present invention a cost-effective one.

What is particularly advantageous is if two opposite wheel rims, or subsections of two wheel rims, of a vehicle axis are detected at the same time by one measuring head of the measuring device, respectively, and their positions relative to the measuring heads are ascertained. In this context, the return message signal advantageously indicates whether the two wheel rims are located in a position suitable for measurement or not.

In another advantageous specific embodiment of the method according to the present invention, the motor vehicle is finally moved, with the aid of the return message signal, in such a way that the wheel rim(s) or subsection(s) thereof is/are located in an optimal position suitable for the measurement.

The advantageous refinements that now follow, of the method according to the present invention, relate to those specific embodiments of the present invention in which the measuring device or the measuring sensors or measuring head of the measuring device is moved in order to reach an optimal positioning of the object to be measured with respect to the measuring device. In this context, only the position and location of the measuring device, the measuring sensors or the measuring head is modified. The object to be measured may, in this instance, be a component of the measuring station, e.g. a turntable or a rotary disk for a motor vehicle wheel. The object to be measured may likewise be formed by the motor vehicle wheel or a subsection of the motor vehicle wheel.

The method of this type according to the present invention may accordingly be designated as a method for positioning a measuring device, or of measuring sensors/a measuring head of a measuring device with respect to an object to be measured, especially to a wheel rim of a motor vehicle or to a rotary disk.

In an additional specific embodiment of the present invention, in the case in which the object to be measured is not located in a position suitable for the measurement, the return message signal further indicates in which direction the measuring device, the measuring sensors or a measuring head of the measuring device is to be moved. To do this, it is necessary that the measuring device, the measuring sensors or the measuring head is able to be moved longitudinally. In this context, it is not only automatically detected that the measuring device is not yet located in an optimal position with respect to the object to be measured, but it is stated at once how the optimal position may be produced, in order to simplify and speed up the method.

In the case of the object to be measured, if we are talking about a longitudinally movable rotary disk for a motor vehicle wheel, this longitudinally movable rotary disk may be set into a desired position within the measuring station at the beginning of the method, and subsequently, the measuring device or the measuring sensors or measuring head of the measuring device is aligned with respect to the rotary disk, thus set, in such a way that the rotary disk is located in a position suitable for the measurement, and that the measuring device, the measuring sensors or the measuring head of the measuring device is/are concentric with the rotary disk.

The alignment of the measuring device or of the measuring sensors or of the measuring head of the measuring device may be performed manually by the user or in a motor-actuated manner, in this instance.

The present invention also relates to a method for the relative positioning of a motor vehicle to a chassis measuring device having at least one front and one rear measuring head or to a motor vehicle test line having at least one front and one rear measuring head. In this context, first of all a method of the type described above is carried out for at least one front wheel rim of the motor vehicle, so that the front wheel rim is located in an optimal position that is suitable for measuring with respect to at least one front measuring head. Then the rear measuring head detects a rear wheel rim, and the position of the rear wheel rim is ascertained relative to the rear measuring head. For this purpose, the measuring device has a suitable data processing unit. Subsequently, a return message signal is generated, which indicates whether the rear wheel rim is located in a position that is suitable for taking the measurement or not.

It may be seen from the return message signal whether the rear wheel rim is already in a position suitable for the measurement, or whether the rear measuring head has to be displaced.

According to one advantageous refinement, in the case in which the rear wheel rim is not located in a position suitable for the measurement, the return message signal indicates in which direction the rear measuring head is to be moved. This further increases the user-friendliness of the method, for, merely with the aid of the return message signal, the rear measuring head, too, may finally be aligned optimally with respect to the rear wheel rim. This achieves a rapid and accurate positioning of a motor vehicle with respect to a chassis measuring device.

It is particularly advantageous if the rear measuring head is moved manually, or in a motor-actuated manner, with the aid of the return message signal, in such a way that the rear wheel rim is located in an optimal position that is suitable for measuring, with respect to at least one measuring head.

If the chassis measuring device is designed to measure in a contactless manner, one may make use of any sensor system that is already present without an additional sensor system being required. In this instance, the motor vehicle is first moved in such a way that at least one front wheel rim is located within the visual range of a front measuring head of the measuring device.

The return message signal may be an optical signal that is emitted, for example, on one or more displays of at least one measuring devices on a separate screen or using a signal light.

The return message signal may also be an acoustical signal, for instance, a buzzing tone or a verbal signal.

Moreover, the return message signal may also be a mechanical signal, such as a vibrational signal.

The method may be carried out in a particularly user-friendly manner if the return message signal is visualized as an optical arrow signal or as a signal in the form of a similarly meaningful object, and is emitted on a screen or a display device. In this context, the signal is processed further for visualization by software and prepared appropriately in an ergonomic manner.

An arrow control unit is especially advantageous, in which the user is given additional information concerning the length, width, shape, color, etc. of the arrows; for instance, a short arrow may designate a position that is very close to the optimal position, whereas a longer arrow indicates a position that is still far removed from the optimal position.

In order to make it possible to position a rotary disk of the measuring station individually for the measuring of a motor vehicle, for instance, for taking into account the wheelbase of the motor vehicle, and to optimally position a front measuring head of the measuring device with respect to the rotary disk thus positioned, at the beginning of the method according to the present invention, for the relative positioning of a motor vehicle with respect to a chassis measuring device having at least one front and one rear measuring head, one may first carry out a method for the relative positioning of a measuring device with respect to a turntable of the type described above. In the process, the turntable is detected, its position is ascertained and the measuring device is aligned according to the turntable.

According to one additional advantageous specific embodiment of the present invention, the measuring station is monitored by the measuring device or the measuring heads of the measuring device to see whether a motor vehicle is located in the measuring station or not. The positioning method is automatically started when a motor vehicle is moved into the measuring station. With that, a switchover is made possible in and out of standby operation, whereby energy may be saved, and, for example, the screen or the display device may be used for other displays, such as showing a marketing logo, when the measuring system detects that there is no motor vehicle in the measuring station.

One further advantageous embodiment of the method according to the present invention relates to the case that the motor vehicle to be measured has more than two axles, such as a truck. In this context, one measuring head is shifted for the third and for each additional axle in such a way that the wheel rim of the third and additional vehicle axle is located in its measuring range, and for this additional wheel rim, the steps of detecting the wheel rim, of ascertaining the position of the wheel rim and of generating the return message signal are repeated. The rear measuring head, in particular, may be shifted in this connection, and the front measuring head may remain in place. Alternatively, the front and rear measuring heads may be shifted towards the rear in each case, respectively, one after the other about a vehicle axle. Optionally, the additional method steps provided in the corresponding dependent claims may also be carried out for each additional wheel rim that is to be measured.

It is thereby assured that even motor vehicles having three or more axles are able to be measured simply and accurately using the method according to the present invention.

The present invention also relates to a measuring device for determining the spatial position of a wheel rim with respect to the measuring device, which has at least one measuring head having one camera, the wheel rim lying in the visual field of the camera; and an output unit for an optical, acoustical or mechanical return message signal being provided which indicates whether the wheel rim is located in a position suitable for measuring or not. Such a measuring device is able to emit a return message signal, without the need to provide an additional sensor system, which makes it simpler for the user to align the wheel rim with respect to the measuring head.

According to one advantageous refinement of the present invention, the measuring device or the measuring head is able to be displaced along the longitudinal axis of the vehicle, so that the measuring device or the measuring head is able to be positioned individually with respect to a wheel rim.

The present invention also relates to a chassis measuring device for motor vehicles as well as a motor vehicle test line which includes at least one measuring device, which is positioned in such a way that one measuring device is allocated in each case to one of the wheels of the motor vehicle, the relative positions of the measuring devices being determined when the measurements are made. Furthermore, a computer or a data processing unit is provided which recalculates the measuring results of the measurement at the wheels of the motor vehicle, taking into account the relative position of the measuring devices, into wheel position values and into return message signals via the relative positions of the measuring devices to the wheels of the motor vehicle. In addition, at least one optical, acoustical or mechanical output unit is provided for a return message signal, which outputs or displays the wheel position values and/or the return message signals. Owing to such a chassis measuring device, the measuring devices are able to be positioned rapidly and accurately with respect to the wheels of the motor vehicle, while making use of the return message signals.

The measuring device as well as the chassis measuring device may be advantageously developed further according to the present invention, as is shown by the features mentioned above with respect to the method claims. These will not be specifically listed again, to avoid repetition.

The measuring device, the chassis measuring device for motor vehicles as well as the test line for motor vehicles are advantageously developed in such a way that, because of them, a method according to the present invention, of the type described above, is able to be carried out.

In summary, it can be concluded that the methods and devices according to the present invention, of the type described above, represent a rapid, cost-effective and accurately operating parking assistance or positioning aid for a motor vehicle.

The present invention is elucidated in the following on the basis of exemplary embodiments, in conjunction with the enclosed drawings.

DETAILED DESCRIPTION

Figure 1:
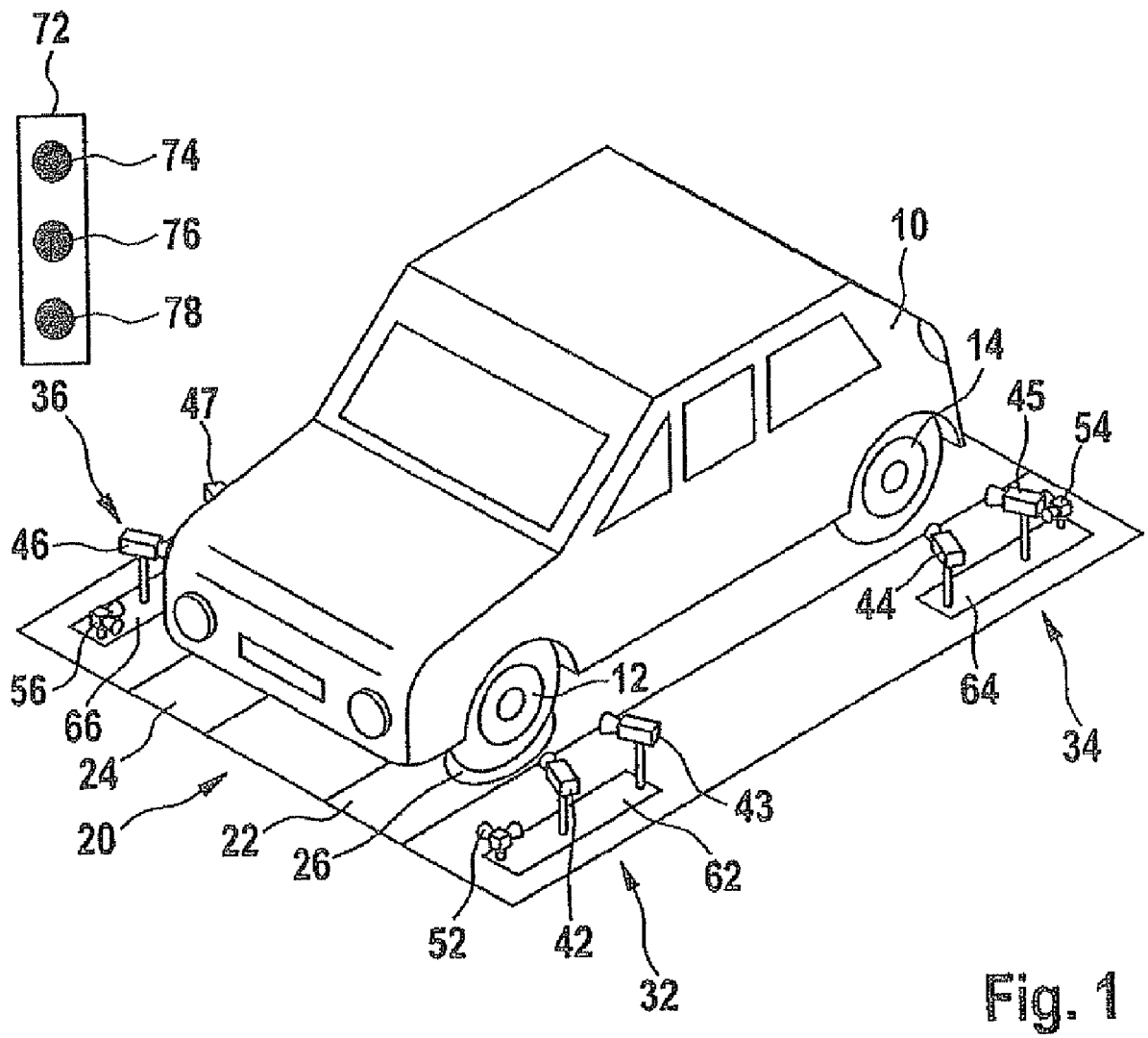
FIG. 1 shows a schematic, perspective view of a measuring station having a motor vehicle standing on it.

FIG. 1 shows a schematic, perspective view of a measuring station 20, having a motor vehicle 10 standing on the measuring station 20.

Motor vehicle 10 is situated on measuring station 20 for the measurement of its chassis. Motor vehicle 10 has a front left wheel rim 12, a rear left wheel rim 14, which is easily seen in the perspective view of FIG. 1, and it also has a front right wheel rim 16 and a rear right wheel rim 18, which are covered in the illustration according to FIG. 1 by the body of motor vehicle 10.

On measuring station 20, four measuring devices 32, 34, 36 and 38 are positioned to be longitudinally displaceable with respect to the longitudinal axis of motor vehicle 10. Of these measuring devices 32, 34, 36 and 38, front left measuring device 32, rear left measuring device 34 and front right measuring device 36 are seen in FIG. 1, while rear right measuring device 38 is hidden by motor vehicle 10. Measuring devices 32, 34, 36 and 38 have displaceable base plates 62, 64, 66 and 68 along the longitudinal axis of motor vehicle 10. On these base plates 62, 64, 66 and 68 there are situated in each case two measuring cameras 42, 43; 44, 45; 46, 47; and 48, 49, which are directed at different angles to the respectively opposite wheel rim 12, 14, 16 and 18.

Measuring station 20 has two elongated tire contact areas 22, 24 which have turntables and slide plates. These elongated tire contact areas 22, 24 are developed as travel rails in the case of lifting platforms, and as drive-up areas in the case of repair shop pits. In the front area of tire contact areas 22, 24, respectively a rotary disk 26 (may be seen in FIG. 1) and 28 (hidden by motor vehicle 10 in FIG. 1) is situated, to enable measurements to be made in which the front wheel rims 12 and 16 have to be cramped.

These rotary disks 26 and 28 are also longitudinally displaceable along the longitudinal axis of motor vehicle 10 and along tire contact areas 22, 24, so that measuring station 20 may be set to accommodate vehicles 10 having different wheel bases.

On displaceable base plates 62, 64, 66 and 68 of measuring devices 32, 34, 36 and 38 there are also situated reference system measuring heads 52, 54, 56 (easily seen in FIG. 1) as well as 58 (hidden in FIG. 1), which permit optical measurement of relative angle positions and the distances of measuring devices 32, 34, 36 and 38 from one another. To do this, each reference system measuring head 52, 54, 56 and 58 has two transmit/receive units, not shown in detail in FIG. 1, which are directed to the respectively opposite reference system measuring head 52, 54, 56 and 58 in the respectively longitudinal and transverse direction of motor vehicle 10. When using such a reference system, a roughly aligned mounting position of measuring devices 32, 34, 36 and 38 is sufficient for an exact determination of the relative positions and the distances of measuring devices 32, 34, 36 and 38 from one another. These are able to be measured and also realigned continuously. The function of such a measuring station 20 is known to one skilled in the art from DE 10 2004 013 441 A1.

Reference system measuring heads 52, 54, 56 and 58 in FIG. 1 are situated near the corners of measuring station 20, so that, between front left reference system measuring head 52 and front right reference system measuring head 56 there is visual contact in front of front wheel rims 12 and 16 of motor vehicle 10, and rear reference system measuring heads 54 and 58 are in visual contact behind rear wheel rims 14 and 18 of motor vehicle 10.

Measuring devices 32, 34, 36 and 38 are connected to a data processing unit not shown in FIG. 1, particularly a repair shop computer, which controls a display unit 72. In FIG. 1, display unit 72 is shown in exemplary fashion, and includes a light display "forward" 74, a light display "stop" 76 and a light display "backwards". Light displays "forward" 74 and "backwards" 78 indicate to the operator in which direction motor vehicle 10 or the respective measuring device 32, 34, 36 and 38 is to be moved. Light display "stop" 76 indicates that motor vehicle 10 or the respective measuring device 32, 34, 36 and 38 is already in the optimal position.

Figure 2:
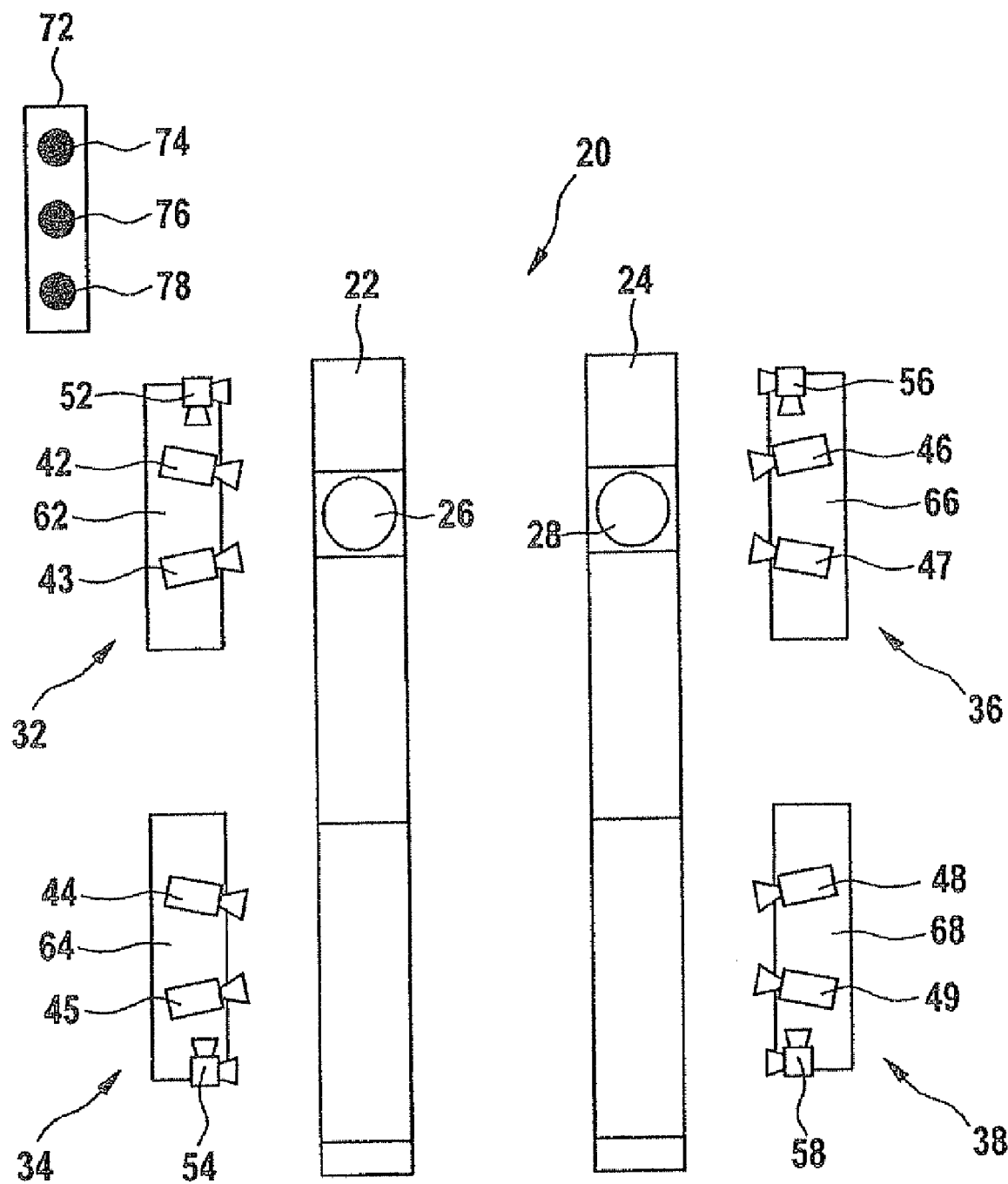
FIG. 2 shows a top view onto the measuring station from FIG. 1 without the motor vehicle.
Figure 3:
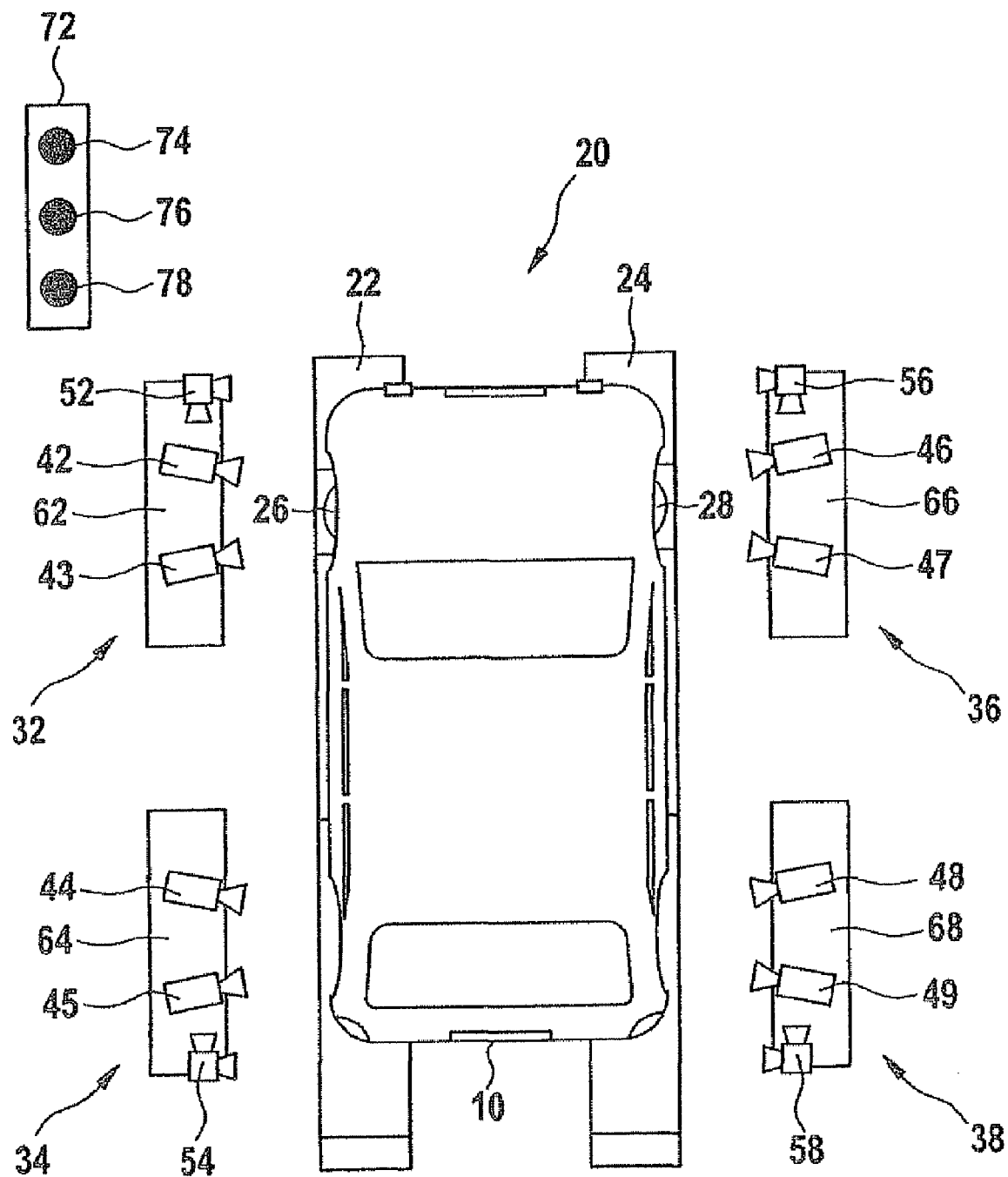
FIG. 3 shows a top view onto the measuring station from FIG. 1, having a motor vehicle standing on the tire contact area and on the turntables and slide plates.

In FIGS. 1 to 3, display unit 72 is only shown in exemplary form as signal lights. Other visualizations, such as an arrow control on a screen, or acoustical or mechanical return message signals would likewise be possible.

Display unit 72 may be situated outside motor vehicle 10, within the visual range of the driver. Alternatively to this, display unit 72 may also be a mobile unit, which the driver can take along with him in motor vehicle 10.

FIG. 2 shows a top view onto measuring station 20 without motor vehicle 10 being situated in it.

The same elements are characterized in FIGS. 2 and 3 by the same reference numerals as in FIG. 1. To avoid repetition, they are not explained again.

In this context, tire contact areas 22 and 24, as well as rotary disks 26 and 28 for the front wheels of a motor vehicle, that are situated in a front section of tire contact areas 22 and 24, are easily seen. Furthermore, measuring devices 32, 34, 36 and 38, as described in FIG. 3 of DE 10 2005 022 565.9, are base-mounted and their base plates 62, 64, 66 and 68 are also developed to be displaceable. As is easy to see in FIG. 2, reference system measuring heads 52, 54, 56 and 58 are aligned towards the middle and visual contact occurs, between reference system measuring heads 52 and 56 as well as 54 and 58 that are opposite transversely with respect to motor vehicle 10, differently from the way shown in FIG. 1, namely, between the axes of motor vehicle 10.

FIG. 3 shows a top view onto measuring station 20 having a motor vehicle 10 standing on tire contact areas 22 and 24.

As is easy to see, front wheels 12 and 16 of motor vehicle 10 are standing on rotary disks 26 and 28.

Figure 4:
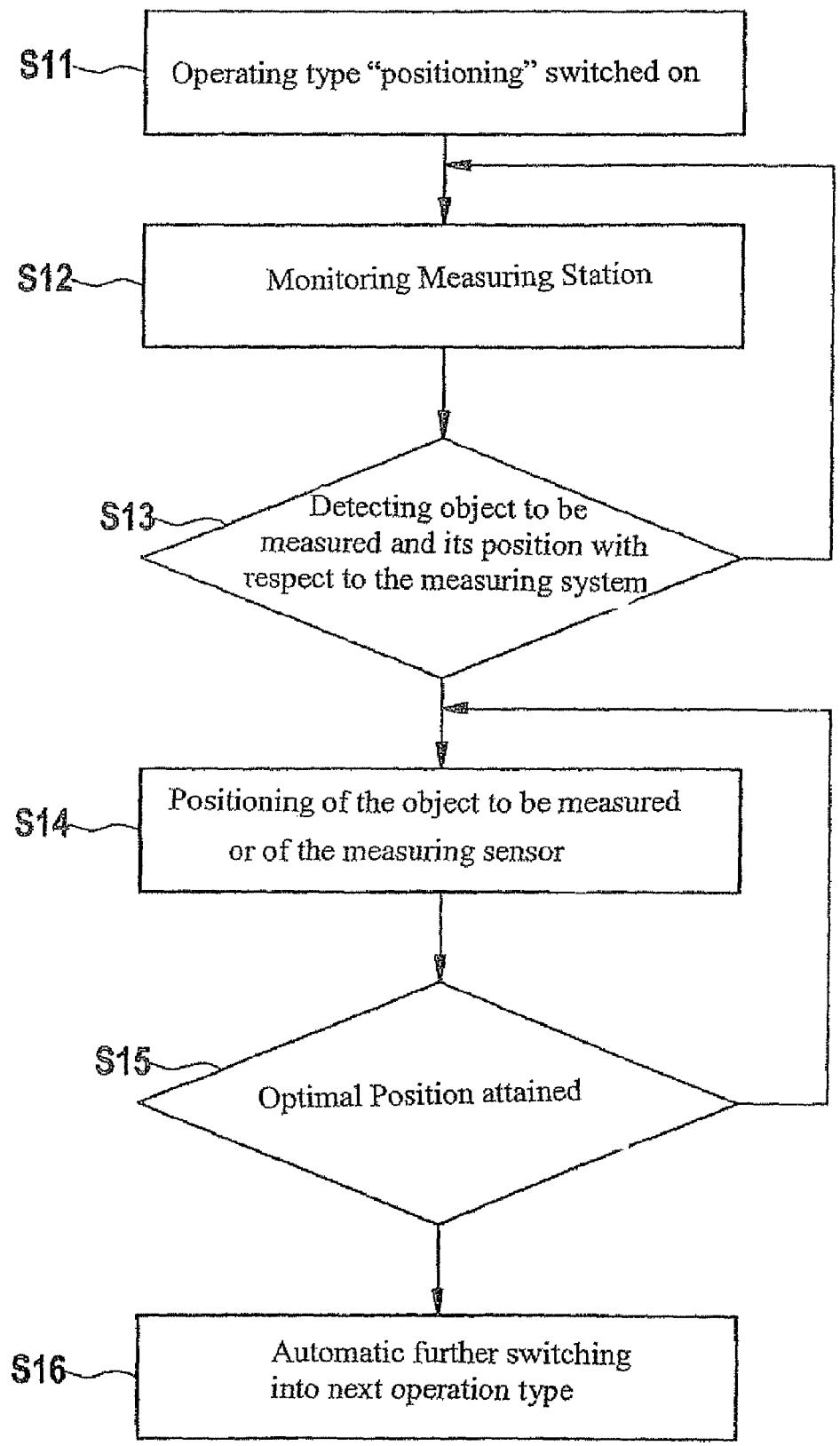
FIG. 4 shows a flow chart of a method according to the present invention for the relative positioning of an object to be measured with respect to a measuring device.

FIG. 4 shows a flow chart of a method according to the present invention for the relative positioning of an object to be measured with respect to a measuring device.

This method may advantageously be carried out on a measuring station 20 as it is shown in FIGS. 1 and 3. In one simple exemplary embodiment, only two measuring devices 32 and 36 or 34 and 38 may be provided that are opposite to each other transversely to the vehicle direction. In one even simpler exemplary embodiment, providing a single measuring device is also sufficient. Measuring devices 32, 34, 36 and 38 shown in FIGS. 1 to 3 operate in a contactless manner. The method shown in FIG. 4 may obviously, however, also be carried out using measuring devices that work in a contact-bound manner.

At the beginning of the method, operating type "positioning" is switched on by the user (method step S11). This switching on takes place either directly at the measuring device or at the respective measuring device in a case where a plurality of measuring devices is provided. Likewise, in the case where several measuring devices are provided, the switching-on process may be controlled originating from one of the measuring devices, so that only one measuring device needs to be switched on by the user. Alternatively to this, the switching on may also take place at a data processing unit not shown in the figures, especially at a repair shop computer that is connected to the measuring device or measuring devices.

We shall first explain a first variant of the method shown in FIG. 4, in which rotary disks 26 and 28 are set to an individual position, and then the two measuring devices 32 and 36 are aligned with respect to this position of rotary disks 26 and 28.

In step S12, measuring station 20 is monitored by measuring devices 32 and 36. Rotary disks 26 and 28 are set either manually by a user, or motor-actuated to a desired longitudinal position on tire contact areas 22, 24, so that a motor vehicle 10 having an individual wheel base is able to be measured on measuring station 20. Consequently, in FIG. 2 the two rotary disks 26 and 28 are moved forward, so that they are no longer located centrically to measuring devices 32 and 36. The displacing of the rotary disks 26 and 28 takes place, in this context, by inserting or taking out filler pieces in front of and behind rotary disks 26 and 28.

In step S13, measuring devices 32 and 36, or the data processing unit connected to measuring devices 32 and 36, detect the objects to be measured, namely rotary discs 26 and 28 that have been pushed forward, and ascertain their position with respect to measuring devices 32 and 36. On display unit 72, display "forward" 74 lights up, which tells the user that measuring devices 32 and 36 are to be pushed forward. Thereupon the user displaces measuring devices 32 and 36 using their displaceable base plates 62 and 66 so far forward (method step S14) until display "forward" 74 goes out and instead of it display "stop" 76 lights up on display unit 72 (method step S15).

The displacing of measuring devices 32 and 36 in method step S14 may take place manually, in this context. Measuring devices 32 and 36 may also be moved automatically in a motor-actuated manner centrically to rotary disks 26 and 28.

The position of rotary disks 26 and 28 is automatically monitored by measuring sensors or measuring cameras 42, 43, 46 and 47, and the alignment of measuring devices 32 and 36 to these rotary disks 26 and 28 is visualized via display unit 72.

After the optimal position has been attained (method step S15), according to method step S16, switching over to the next operating type takes place automatically. The method shown in FIG. 4 may consequently be applied and used as a module in any desired working steps or measuring steps in chassis measuring.

In a second variant of the method shown in FIG. 4, front wheel rims 12 and 16 of motor vehicle 10 represent the objects to be measured, and front wheel rims 12 and 16 are optimally positioned with respect to measuring devices 32 and 36.

After method step S11, empty measuring station 20 shown in FIG. 2 is monitored in method step S12 by measuring devices 32 and 36. Now a motor vehicle 10 is driven onto measuring station 20, as shown in FIG. 3, and measuring devices 32 and 36 detect wheel rims 12 and 16, as soon as they enter their visual range, and they ascertain their position with respect to measuring devices 32 and 36 (method step S13). A return message concerning the position of front wheel rims 12 and 16 with respect to measuring devices 32 and 36 is transmitted to the driver of motor vehicle 10 via a return message signal, namely via the lighting up of display "forward" 74 when vehicle 10 drives in, or by the lighting up of display "backwards" 78 if the vehicle has been driven too far forward, so that the driver is able to move motor vehicle 10 appropriately forward or backwards until display "stop" 76 lights up (method step S14), so that the optimal position is reached (method step S15). In the process, it is not necessary for the driver to follow the relative positions of measuring devices 32 and 36 with respect to wheel rims 12 and 16, but it is quite sufficient for him to follow displays 74, 76 and 78 on display unit 72.

Alternatively to being manually driven into measuring station 20, the motor vehicle may also be driven into the measuring station and positioned in a motor-actuated manner.

Here too, in method step S16, switching over to the next operating type takes place, and this method may also be applied and used as a module in any working steps or measuring steps. For instance, as was just described, wheel rims 12 and 16 of the motor vehicle's front axle may be aligned with measuring devices 32 and 36, and subsequently a series of other method steps may be run through, and after these steps, for instance, the next axle of motor vehicle 10 may be aligned at their measuring devices 32, 34, 36 and 38.

Figure 5:
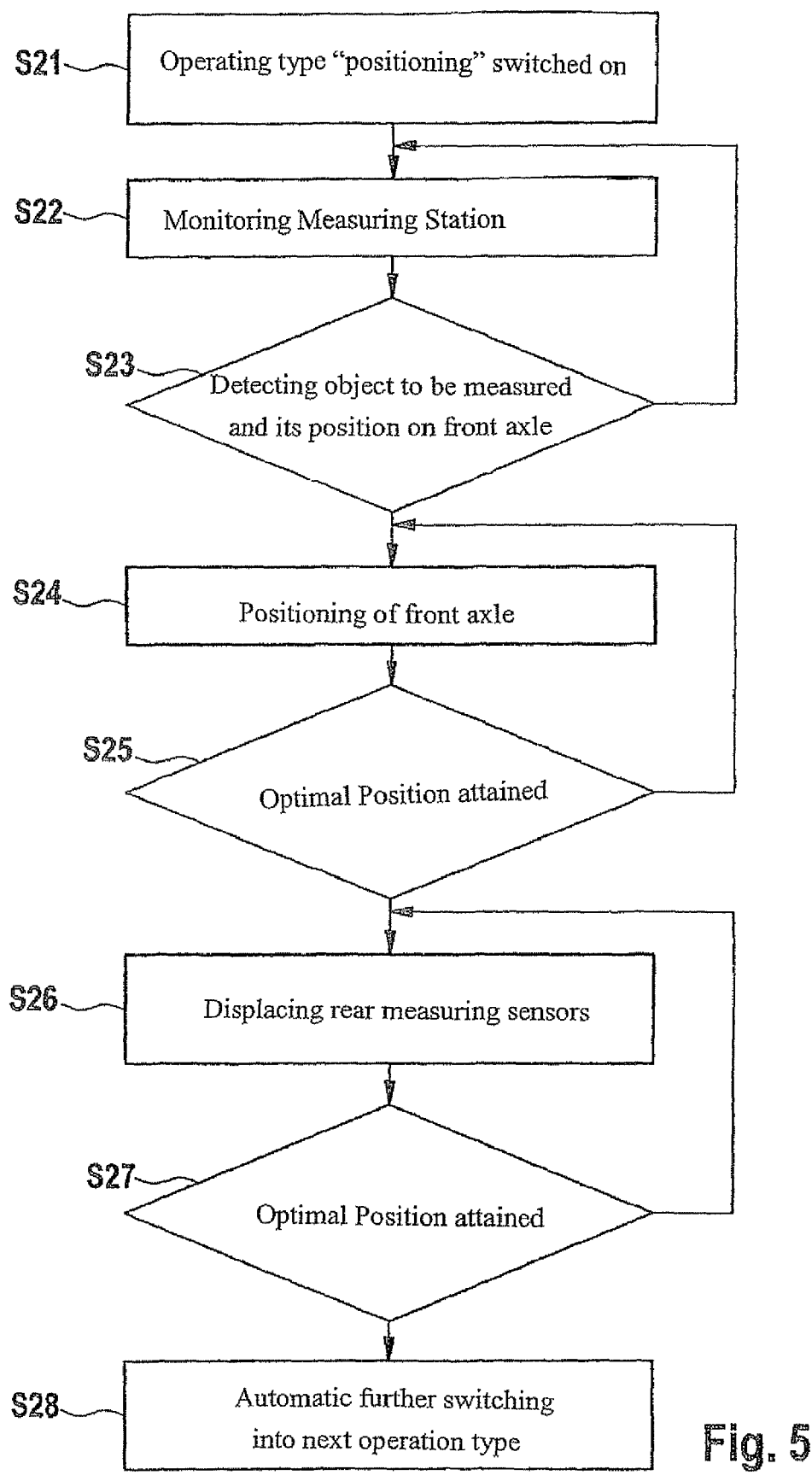
FIG. 5 shows a flow chart of a method according to the present invention for the relative positioning of the motor vehicle to the chassis measuring device.

FIG. 5 shows a flow chart of a method according to the present invention for the relative positioning of motor vehicle 10 to the chassis measuring device using measuring devices 32, 34, 36 and 38.

To begin with, operating type "positioning" is switched in, either at measuring devices 32, 34, 36 and 38 or at a data processing unit connected to them, especially the repair shop computer.

Method steps S22, S23, S24 and S25 correspond to method steps S12, S13, S14 and S15 of FIG. 4 for the positioning of wheel rims 12 and 16 of the front axle of motor vehicle 10 with respect to front measuring devices 32 and 36 (second variant described above).

Thus, after method step S25, wheel rims 12 and 16, and consequently the entire motor vehicle 10 are aligned optimally with respect to front measuring devices 32 and 36. Because of different wheel bases of motor vehicles, it happens regularly that rear measuring devices 34 and 38 are not aligned optimally, or even not at all, with respect to wheel rims 14 and 18 of the rear axle of motor vehicle 10.

After method step S25, the program automatically switches over into operating type "positioning of rear axle sensors". Alternatively to this, this switching over may also be carried out manually by the user via remote control or via a keyboard.

Rear measuring devices 34 and 38 detect rear wheel rims 14 and 18, and their position with respect to measuring devices 34 and 38 is ascertained, namely, either by measuring devices 34 and 38 themselves or by a data processing unit connected to them.

Display unit 72 now makes visual to the user in which direction rear measuring devices 34 and 38 have to be displaced. If "forward" 74 lights up, rear measuring devices 34 and 38 have to be displaced forward until display "stop" 76 lights up, and if "backwards" 78 lights up, measuring devices 34 and 38 have to be displaced backwards until display "stop" 76 lights up (method step S26 and S27). The displacement of rear measuring devices 34 and 38 into the correct position may be carried out either manually by the user or even automatically in a motor-actuated manner, in this context.

After method step S27, all measuring devices 32 through 38 are aligned optimally with respect to wheel rims 12 through 18, and, according to method step S28, the method switches over to the next operating type, in particular, there now follows operating type "measuring", in which the actual chassis measuring is carried out.

In an additional exemplary embodiment of the present invention, displaceable rotary disks 26 and 28 are first set into the desired position, in order to set measuring station 20 for a desired wheel base of motor vehicle 10 that is to be measured, and front measuring devices 32 and 36, as was described in the first variant of FIG. 4, are aligned in preparation of measuring station 20 with respect to the newly set rotary disks 26 and 28. Thereafter, the method described with reference to FIG. 5 is carried out, in which, first of all, motor vehicle 10 is driven onto measuring station 20, and its front wheel rims 12 and 16 are positioned optimally with respect to front measuring devices 32 and 36, and subsequently rear measuring devices 34 and 38 are aligned with wheel rims 14 and 18.

An optimal positioning of measuring devices 32 through 38 with respect to wheel rims 12 through 18 may be achieved in a simple manner by using such a positioning method. Existing measuring devices 32 through 38 may be used for this without the need for providing an additional sensor system, which particularly yields cost savings.

Figure 6:
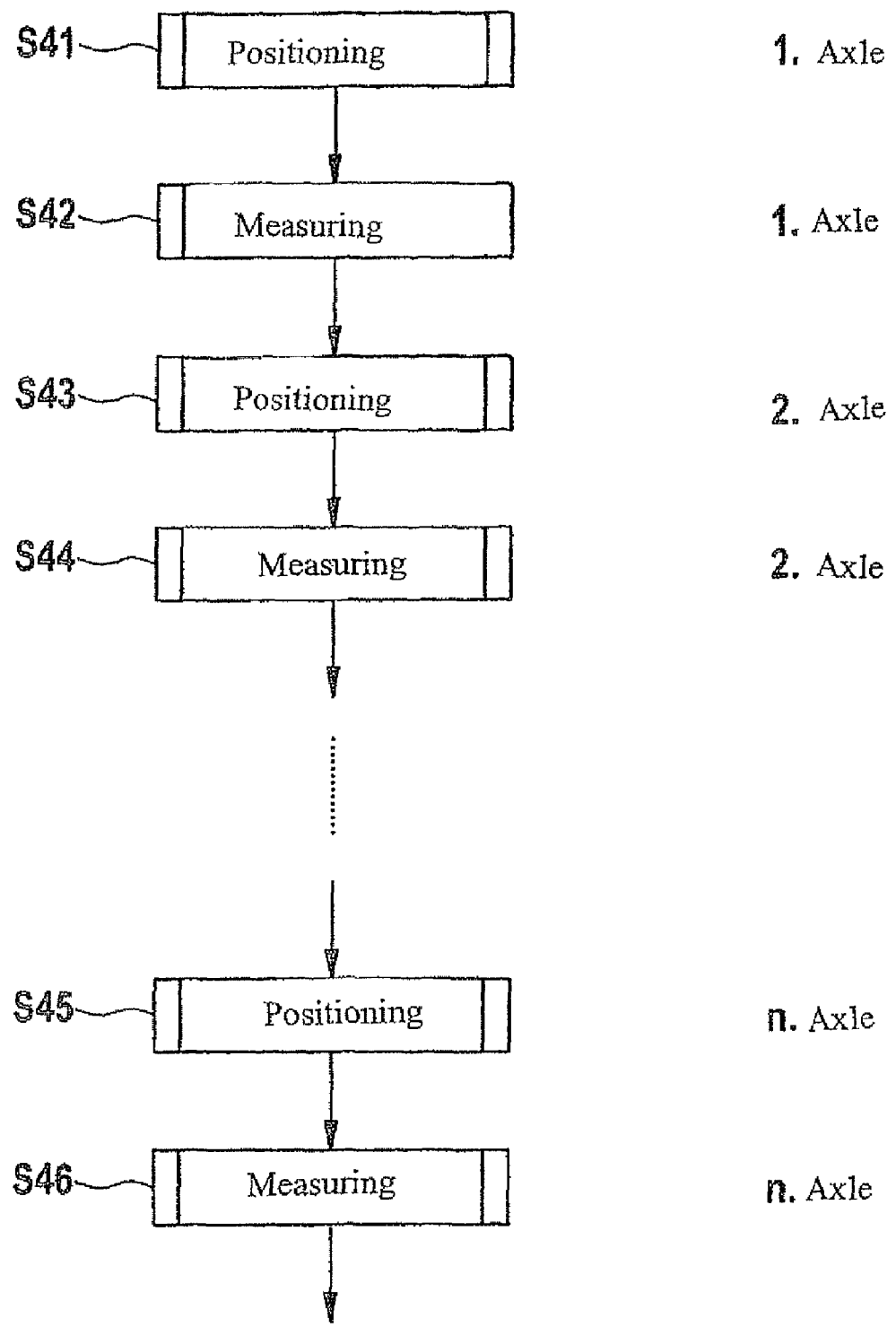
FIG. 6 shows a flow chart of a method according to the present invention, in which, one after another, the wheel rims of n axles are positioned and measured with respect to the measuring devices of the chassis measuring device.

FIG. 6 shows a flow chart of a method according to the present invention, in which, one after another, the wheel rims of n axles are positioned and measured with respect to measuring devices 32, 34, 36 and 38.

In first method step S41, in this context, front wheel rims 12 and 16 are aligned with front measuring devices 32 and 36, as is described in the second alternative of FIG. 4, by method steps S12 to S15, and in FIG. 5 by method steps S22 to S25. There subsequently takes place the measuring process for front wheel rims 12 and 16 (method step S42). This method step may alternatively be carried out at appropriate places. That depends on the sequence. For instance, this method step may also be carried out directly before, or together with method step S44. In method step S43, rear measuring devices 34 and 38 are now aligned, according to method steps S26 and S27 in FIG. 5, with respect to wheel rims 14 and 18 of the second axle.

Method steps S43 and S44 are repeated for the third and each additional axle of motor vehicle 10. The alignment of front measuring devices 32 and 36 with front wheel rims 12 and 16 may be maintained, in this context, and only rear measuring devices 34 and 38 need to be displaced so that they are aligned optimally with respect to the wheel rims of the third, and each further axle of motor vehicle 10.

Using this method, even motor vehicles having three or more axles are able to be positioned and measured using the existing chassis measuring device, without the need of providing an additional sensor system.

The List of reference symbols is as follows:
10 motor vehicle;
12, 14, 16, 18 wheel rims;
20 measuring station;
22, 24 tire contact areas;
26, 28 rotary disk;
32, 34, 36, 38 measuring devices;
42, 43; 44, 45;
46, 47; 48, 49 measuring cameras;
52, 54, 56, 58 reference system measuring heads;
62, 64, 66, 68 displaceable base plates;
72 display unit;
74 display "forward";
76 display "stop"; and
78 display "backwards".

What is claimed is:

1. A method for relatively positioning an object to be measured with respect to at least one of a measuring device of a chassis measuring device and a motor vehicle test line, the method comprising:
automatically detecting the object to be measured by the measuring device;
ascertaining a position of the object to be measured with respect to the measuring device; and
generating a return message signal which indicates whether the object to be measured is located in a position suitable for the measurement,
wherein, in the case in which the object to be measured is not located in a position suitable for the measurement, the return message signal further indicates in which direction the object to be measured is to be moved.

2. The method of claim 1, wherein the object to be measured is a wheel rim of a motor vehicle or a subsection of a wheel rim of a motor vehicle, at the beginning of the method a motor vehicle being moved in such a way that one wheel rim of the motor vehicle is located within the measuring range of the measuring sensors of the measuring device.

3. The method of claim 2, wherein the measuring device measures in a contactless manner, and wherein at a beginning of the method the motor vehicle is moved so that at least a subsection of a wheel rim of the motor vehicle is located in a visual range of measuring sensors of the measuring device.

4. The method of claim 2, wherein one of two opposite wheel rims and subsections of two opposite wheel rims of a vehicle axle are detected at a same time by respectively one measuring head of the measuring device, and their positions relative to the measuring heads are ascertained and the return message signal indicates whether the two wheel rims are located in a position suitable for the measurement.

5. The method of claim 1, wherein the object to be measured is a rotary disk for a motor vehicle and at the beginning of the method, the longitudinally displaceable rotary disk is set to a desired position.

6. The method of claim 5, wherein the alignment of the measuring device or the measuring sensors of the measuring device takes place in a motor-actuated manner.

7. A method for relatively positioning an object to be measured with respect to at least one of a measuring device of a chassis measuring device and a motor vehicle test line, the method comprising:
automatically detecting the object to be measured by the measuring device;
ascertaining a position of the object to be measured with respect to the measuring device; and
generating a return message signal which indicates whether the object to be measured is located in a position suitable for the measurement,
wherein the object to be measured is a wheel rim of a motor vehicle or a subsection of a wheel rim of a motor vehicle, at the beginning of the method a motor vehicle being moved in such a way that one wheel rim of the motor vehicle is located within the measuring range of the measuring sensors of the measuring device,
wherein, with the aid of the return message signal, the motor vehicle is moved so that the wheel rims or at least a subsection of the wheel rims are located in a position suitable for the measurement.

8. A method for relatively positioning an object to be measured with respect to at least one of a measuring device of a chassis measuring device and a motor vehicle test line, the method comprising:
automatically detecting the object to be measured by the measuring device;
ascertaining a position of the object to be measured with respect to the measuring device; and
generating a return message signal which indicates whether the object to be measured is located in a position suitable for the measurement,
wherein, in the case in which the object to be measured is not located in a position suitable for the measurement, the return message signal further indicates in which direction the measuring device or the measuring sensors of the measuring device is to be moved.

9. A method for relatively positioning an object to be measured with respect to at least one of a measuring device of a chassis measuring device and a motor vehicle test line, the method comprising:
automatically detecting the object to be measured by the measuring device;
ascertaining a position of the object to be measured with respect to the measuring device; and
generating a return message signal which indicates whether the object to be measured is located in a position suitable for the measurement,
wherein the object to be measured is a rotary disk for a motor vehicle and at the beginning of the method, the longitudinally displaceable rotary disk is set to a desired position,
wherein the measuring head or the measuring sensors of the measuring device is aligned with the aid of the return message signal so that the rotary disk is located in a position suitable for the measurement.

10. A method for relatively positioning an object to be measured with respect to at least one of a measuring device of a chassis measuring device and a motor vehicle test line, the method comprising:
automatically detecting the object to be measured by the measuring device;
ascertaining a position of the object to be measured with respect to the measuring device; and
generating a return message signal which indicates whether the object to be measured is located in a position suitable for the measurement,
wherein the object to be measured is a rotary disk for a motor vehicle and at the beginning of the method, the longitudinally displaceable rotary disk is set to a desired position,
wherein the measuring device or the measuring sensors of the measuring device are aligned with the aid of the return message signal so that it is concentric with the rotary disk.

11. A method for relatively positioning a motor vehicle with respect to at least one of a chassis measuring device and a motor vehicle test line having at least one front measuring device and having at least one rear measuring device, comprising:
  a) relatively positioning an object to be measured with respect to at least one of a measuring device of a chassis measuring device and a motor vehicle test line, by performing the following:
    automatically detecting the object to be measured by the measuring device;
    ascertaining a position of the object to be measured with respect to the measuring device; and
    generating a return message signal which indicates whether the object to be measured is located in a position suitable for the measurement, so that the front wheel rim is located in a position suitable for the measurement with respect to at least one front measuring device;
  b) detecting a rear wheel rim by the rear measuring device;
  c) ascertaining the position of the rear wheel rim relative to the rear measuring device; and
  d) generating a return message signal which indicates whether the rear wheel rim is located in a position suitable for the measurement,
  wherein, in the case in which it is ascertained that the rear wheel rim is not located in a position suitable for the measurement, the return message signal further indicates in which direction the rear measuring device is to be moved.

12. The method of claim 11, wherein at least one measuring device that measures in a contactless manner is provided, and the motor vehicle is moved in a) so that at least one front wheel rim of the motor vehicle is located within the visual range of a front measuring device.

13. The method of claim 11, wherein an optical signal, an acoustical signal or a mechanical signal is emitted as the return message signal.

14. The method of claim 11, wherein the object to be measured is a rotary disk for a motor vehicle and at the beginning of the method, the longitudinally displaceable rotary disk is set to a desired position is carried out before a) for at least one front measuring device and for one front rotary disk, to align at least one front measuring device with respect to a rotary disk for a motor vehicle wheel.

15. The method of claim 11, wherein the measuring station is monitored by the measuring heads of the measuring device as to whether a motor vehicle is located on the measuring station and the method is started automatically if a motor vehicle is moved into the measuring station.

16. A method for relatively positioning a motor vehicle with respect to at least one of a chassis measuring device and a motor vehicle test line having at least one front measuring device and having at least one rear measuring device, comprising:
  a) relatively positioning an object to be measured with respect to at least one of a measuring device of a chassis measuring device and a motor vehicle test line, by performing the following:
    automatically detecting the object to be measured by the measuring device;
    ascertaining a position of the object to be measured with respect to the measuring device; and
    generating a return message signal which indicates whether the object to be measured is located in a position suitable for the measurement, so that the front wheel rim is located in a position suitable for the measurement with respect to at least one front measuring device;
  b) detecting a rear wheel rim by the rear measuring device;
  c) ascertaining the position of the rear wheel rim relative to the rear measuring device; and
  d) generating a return message signal which indicates whether the rear wheel rim is located in a position suitable for the measurement,
  wherein in e) a rear measuring device is moved with the aid of the return message signal so that the rear wheel rim is located in a position suitable for the measurement with respect to at least one rear measuring device.

17. The method of claim 16, wherein in the case that the motor vehicle has more than two axles, the following are carried out for the third and for each additional axle: (i) displacing at least one measuring device so that an additional wheel rim of the motor vehicle is located within the measuring range of this measuring device; and (ii) repeating b), c), d) and, if necessary, e).

18. A method for relatively positioning a motor vehicle with respect to at least one of a chassis measuring device and a motor vehicle test line having at least one front measuring device and having at least one rear measuring device, comprising:
  a) relatively positioning an object to be measured with respect to at least one of a measuring device of a chassis measuring device and a motor vehicle test line, by performing the following:
    automatically detecting the object to be measured by the measuring device;
    ascertaining a position of the object to be measured with respect to the measuring device; and
    generating a return message signal which indicates whether the object to be measured is located in a position suitable for the measurement, so that the front wheel rim is located in a position suitable for the measurement with respect to at least one front measuring device;
  b) detecting a rear wheel rim by the rear measuring device;
  c) ascertaining the position of the rear wheel rim relative to the rear measuring device; and
  d) generating a return message signal which indicates whether the rear wheel rim is located in a position suitable for the measurement,
  wherein an optical arrow signal is emitted onto a screen as the return message signal.

19. A method for relatively positioning a motor vehicle with respect to at least one of a chassis measuring device and a motor vehicle test line having at least one front measuring device and having at least one rear measuring device, comprising:
  a) relatively positioning an object to be measured with respect to at least one of a measuring device of a chassis measuring device and a motor vehicle test line, by performing the following:
    automatically detecting the object to be measured by the measuring device;
    ascertaining a position of the object to be measured with respect to the measuring device; and
    generating a return message signal which indicates whether the object to be measured is located in a position suitable for the measurement, so that the front wheel rim is located in a position suitable for the measurement with respect to at least one front measuring device;
  b) detecting a rear wheel rim by the rear measuring device;

c) ascertaining the position of the rear wheel rim relative to the rear measuring device; and
d) generating a return message signal which indicates whether the rear wheel rim is located in a position suitable for the measurement,
wherein in e) a rear measuring device is moved with the aid of the return message signal so that the rear wheel rim is located in a position suitable for the measurement with respect to at least one rear measuring device,
wherein in the case that the motor vehicle has more than two axles, the following are carried out for the third and for each additional axle: (i) displacing at least one measuring device so that an additional wheel rim of the motor vehicle is located within the measuring range of this measuring device; and (ii) repeating b), c), d) and, if necessary, e),
wherein at least one rear measuring device is displaced so that an additional wheel rim of the motor vehicle is located within the measuring range of the rear measuring device.

* * * * *